United States Patent
Morales (10) Patent No.: US 7,759,577 B1
(45) Date of Patent: Jul. 20, 2010

(54) BUS BAR SYSTEM (75) Inventor: Osvaldo P. Morales, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 389 days.

(21) Appl. No.: 11/956,854

(22) Filed: Dec. 14, 2007

Related U.S. Application Data (60) Provisional application No. 60/953,076, filed on Jul. 31, 2007.

(51) Int. Cl.
*H02G 5/00* (2006.01)
(52) U.S. Cl. .................. 174/68.2; 174/70 B; 174/88 B; 174/99 B; 174/133 B; 174/72 B; 361/624; 439/210
(58) Field of Classification Search ............... 174/70 B, 174/71 B, 72 B, 88 B, 99 B, 133 B, 68.2; 439/210, 212; 361/664
See application file for complete search history.

(56) References Cited

U.S. PATENT DOCUMENTS

| | | | | |
|---|---|---|---|---|
| 2,274,422 A | * | 2/1942 | Mahoney et al. ........... 174/73.1 |
| 3,609,215 A | * | 9/1971 | Giger et al. ................ 174/88 B |
| 5,422,440 A | * | 6/1995 | Palma ..................... 174/133 B |
| 5,936,834 A | * | 8/1999 | Polston et al. ............... 361/664 |
| 6,616,465 B1 | | 9/2003 | Fontana et al. | |
| 7,091,417 B1 | | 8/2006 | Jur et al. | |
| 2003/0036297 A1 | | 2/2003 | Kilkenney et al. | |
| 2003/0096520 A1 | | 5/2003 | Wolford et al. | |

* cited by examiner

*Primary Examiner*—Dhiru R Patel
(74) *Attorney, Agent, or Firm*—Robert C Kowert; Meyertons, Hood, Kivlin, Kowert & Goetzel, P.C.

(57) ABSTRACT

A system includes two or more bus bars. One or more fasteners couple at least two adjoining bus bars at a slotted joint. The one or more fasteners hold the adjoining bus bars in contact with one another to enable current to pass from one of the adjoining bus bars to another of the adjoining bus bars through the contacting surfaces of the adjoining bus bars. The slotted joint reduces mechanical stress on at least one of the bus bars when the system is under at least one electrical load condition.

29 Claims, 7 Drawing Sheets

BUS BAR SYSTEM

This application claims benefit of U.S. Provisional Patent Application 60/953,076 filed Jul. 31, 2007 which is hereby incorporated by reference in its entirety.

BACKGROUND

1. Field of the Invention

This invention relates to electrical power distribution and, more particularly, to buses for distributing power in mechanical systems, such as cooling systems for electronic equipment.

2. Description of the Related Art

Facilities with distributed electrical systems often include buses to provide electrical power to various systems in the facility and to electrically connect the systems in the facility with one another and with external systems. A typical bus system in a facility may include many bus bars, bus ways, or similar elongated conductive elements that are attached to one another to form a spine or network. The spine or network may be arranged to provide convenient access points at which to tap into electrical power or make other required electrical connections.

In bus systems that provide electrical power to large components (e.g., mechanical components such as motors), elements of the bus bar system may experience large electrodynamic stresses as the loads from the systems vary during use. For example, when a fan motor operating at 480 volts is switched on, a sudden high amperage may cause electrodynamic stress at a joint between two adjoining bus bars carrying power to the motor. The electrodynamic stresses can cause failures at the junctions between the bus bars. In addition, environmental conditions in some systems may result in additional stresses. For example, a bus system that provides power to mechanical components in an air cooling system may be exposed to thermal cycles in the surrounding air as the cooling system is operated.

Many bus systems use bus bars made of copper to take advantage of copper's high electrical conductivity. Aluminum bus bars tend to be less expensive than copper bus elements for a given current capacity, but aluminum has a higher thermal coefficient of expansion and a lower melting point than copper. These characteristics may make an aluminum bus element more susceptible to mechanical failure when subjected to sudden spikes in amperage through the bus system.

SUMMARY

Various embodiments of a bus bar system and method of making a bus bar system are disclosed. In one embodiment, a system includes two or more bus bars. One or more fasteners couple at least two adjoining bus bars at a slotted joint. The one or more fasteners hold the adjoining bus bars in contact with one another to enable current to pass from one of the adjoining bus bars to another of the adjoining bus bars through the contacting surfaces of the adjoining bus bars. The slotted joint reduces mechanical stress on at least one of the bus bars when the system is under at least one electrical load condition (e.g., high amperage spikes through the bus).

In one embodiment, at least one of the bus bars includes one or more slots. One or more fasteners pass through the slots. Under at least one electrical load condition, the slotted joint allows the one or more fasteners to move within the one or more slots and allows the coupled bus bars to move relative to one another in the longitudinal direction of the bus bars.

In an embodiment, a system includes a first bus bar, a second bus bar, and one or more fasteners. The first bus bar includes one or more slots. At least one of the fasteners is coupled with the second bus bar to couple the first bus bar to the second bus bar. A portion each of the one or more fasteners extends through one of the slots in the first bus bar. Each of the one or more fasteners moves along at least a portion of a respective slot to allow relative movement between the first bus bar and the second bus bar along the slot under at least one electrical load condition.

In an embodiment, a method includes connecting a bus bar to at least one other bus bar with one or more fasteners. At least one of the fasteners passes through a slot in one of the bus bars. Torque is applied to within a predetermined range to the one or more fasteners such that the one or more fasteners hold the adjoining bus bars in contact with one another to enable current to pass from one of the adjoining bus bars to another of the adjoining bus bars. The slotted joint reduces mechanical stress on at least one of the bus bars under at least one electrical load condition.

In an embodiment, a bus system includes two or more bus bar assemblies, a fitting that couples one of the bus bar assemblies with at least one other of the bus bar assemblies, and one or more fasteners to secure the bus bar assemblies to the fitting. The fitting includes one or more interconnect bus bars having slots. The fasteners couple in the slots of the interconnect bus bars. The slotted connection may reduce mechanical stress under at least one load condition.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
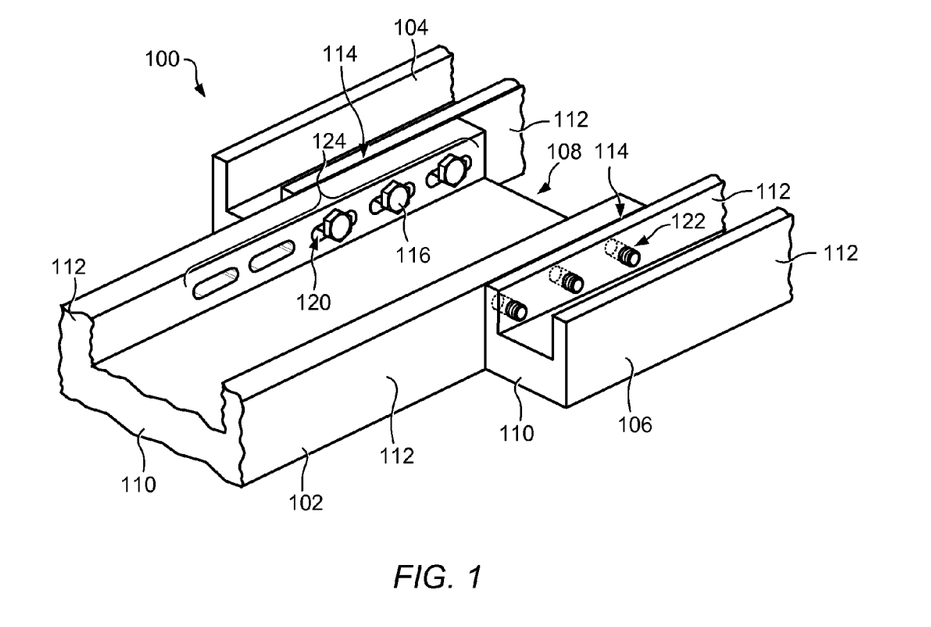
FIG. 1 illustrates one embodiment of a bus bar system with three bus bars fastened together at a joint.

One embodiment of a bus bar system is illustrated in FIG. 1. In the illustrated embodiment, bus bar system 100 includes internal bus bar 102 and external bus bars 104 and 106. Internal bus bar 102 and external bus bars 104 and 106 may carry electrical current during operation of bus bar system 100. In one embodiment, internal bus bar 102 and external bus bars 104 and 106 may be made of aluminum.

Internal bus bar 102 and external bus bars 104 and 106 may generally be elongated in form. In the embodiment shown in FIG. 1, internal bus bar 102 and external bus bars 104 and 106 each include channel 108. Channel 108 defines a u-shaped cross section for bus bars 102, 104, and 106. Internal bus bar 102 and external bus bars 104 and 106 each include base 110 and legs 112. Examples of other suitable cross-sections for a bus bar may include rectangular, square, L-shaped, C-shaped, round, arcuate, and tubular. The cross section of internal bus bar 102 and external bus bars 104 and 106 may be constant or vary over the length of the bus bar.

External bus bars 104 and 106 may be attached to internal bus bar 102 at joints 114. External bus bar 104 and 106 are secured on opposing sides of internal bus bar 102. In some embodiments, the ends of external bus bars 104 may be aligned to be coterminous with one another along the lengths of bus bars. In other embodiments, the ends of bus bars 104 and 106 may be offset with respect to one another.

Bus bar system 100 includes fasteners 116. Examples of suitable fasteners for connecting bus bars together may include threaded fasteners, screws, bolts, studs, nuts, and cam-type fasteners.

Internal bus bar 102 includes slots 120. A longitudinal axis of slots 120 may be parallel to a longitudinal axis of internal bus bar 102. External bus bars 104 and 106 include threaded holes 122. Threaded holes 122 in bus bars 104 and 106 may correspond to slots 120 internal bus bar 102. Bolts 116 may be installed in threaded holes 122 in legs 112 of external bus bars 104 and 106. In certain embodiments, the holes and slots may be reversed relative to what is shown in FIG. 1, e.g., so that fasteners pass through slots in external bus bars and are secured in threaded holes in an internal bus bar. Although in the illustrated embodiment three fasteners are shown securing one bus bar to another, the number of fasteners securing one bus bar to another may in other embodiments be one, two, or more than three.

Bus bar 102 includes row 124 of slots 120. The relative positions of internal bus bar 102 and external bus bars 104 and 106 (e.g., the amount of lengthwise overlap at joint 114 between internal bus bars 102 and external bus bars 104 and 106) may be determined by choosing the slots in which fasteners 116 are installed. For example, the combined length of the internal bus bar 102 and external bus bar 104 may be maximized by installing fasteners 116 in the three most distal slots of internal bus bar 102.

During operation of the system, electrical current may pass from internal bus bar 102 to external bus bars 104 and 106, or vice versa, through the contacting sides of the bus bars at joints 114. In some embodiments, the junction between internal bus bar 102 and external bus bars 104 and 106 may act as an expansion joint to reduce stresses on the bus bars and other elements of the system. During operation, high amperage spikes may place mechanical loads on the bus bars (e.g., axial loads caused by thermal expansion along the length of the bus bars) in the vicinity of joints 114. As the joints 114 are subjected to the loads, fasteners 116 may move within slots (e.g., shifting within the slots along the longitudinal axis of the slots). Movement of fasteners 116 within slots may relieve stresses that would otherwise be carried by the bus bars and/or other components of the system. In addition, some portions of internal bus bar 102 and external bus bars 104 and 106 at or near joints 114 may deform (elastically and/or inelastically) under the loads. Deformation of internal bus bar 102 and external bus bars 104 and 106 at or near joints 114 (e.g., bending in legs 112) may relieve stresses that would otherwise be carried by other portions of the bus bars and/or other components of the system. Stress relief from fastener movement (e.g., within slots 120) and deformation of the bus bars at or near joints 114 may reduce a risk of lost or decreased electrical contact at the joints and a risk of a mechanical failure at the joints. In addition, the incidence of hot spots in the bus bar system may be minimized.

Figure 2:
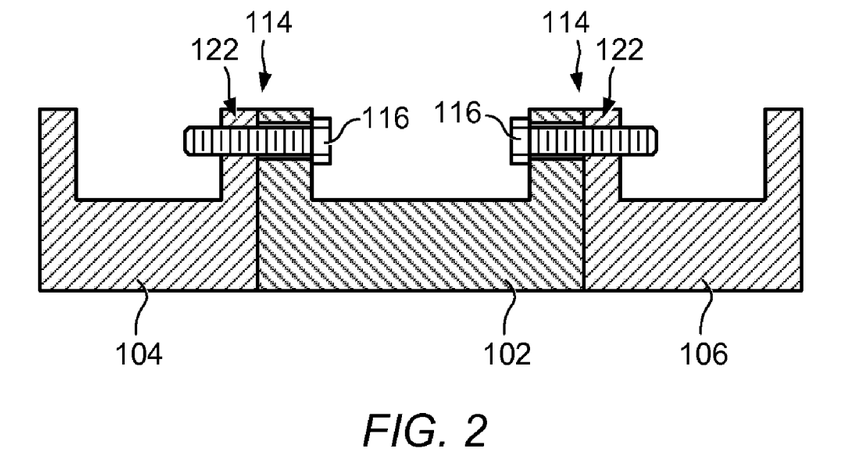
FIG. 2 is a cross sectional view illustrating one embodiment of a bus bar system.

FIG. 2 illustrates an end view of bus bar system 100. In certain embodiments, threaded holes 122 may include threaded inserts (e.g., stainless steel inserts), such as HeliCoil inserts made by Emhart Teknologies.

The dimensions of internal bus bar 102 and external bus bars 104 and 106 may vary depending on current-carrying requirements of the system, the material of the bus bars, and other relevant factors. In one embodiment, a bus bar system includes aluminum bus bars that are about 5 inches high and in standard widths of about 24 inches, about 36 inches, and 48 inches. In certain embodiments, external bus bars 104 and 106 at a joint may be the same size and cross sectional shape as each other.

In some embodiments, the cross sectional area of one segment of a bus bar system is matched with the cross sectional area of one or more other segments of a bus bar system. For example, with reference to bus bar system 100 shown in FIG. 1, if current is to be carried through internal bus bar 102 to external bus bars 104 and 106, the bus bars may be dimensioned so that the sum of the cross sectional areas of external bus bars 104 and 106 is approximately equal to the cross sectional area of internal bus bar 102. Matching cross sectional areas may create equivalent current carrying capacity on both sides of a joint.

During assembly of bus bar system 100, torque may be applied to fasteners 116 to produce an appropriate preload on each fastener. Torque levels may be selected to ensure enough contact pressure at joints 114 to allow a desired amount of current to flow between internal bus bar 102 and external bus bars 104 and 106 under various operating conditions, while still allowing the fasteners to slide within slots 120 to provide stress relief at joints 114 (e.g., under high amperage conditions). In one embodiment, torque is applied to fasteners 116 to achieve the maximum contact pressure at joints 114 that does not exceed the plastic deformation limit of the aluminum bus bar.

Figure 3:
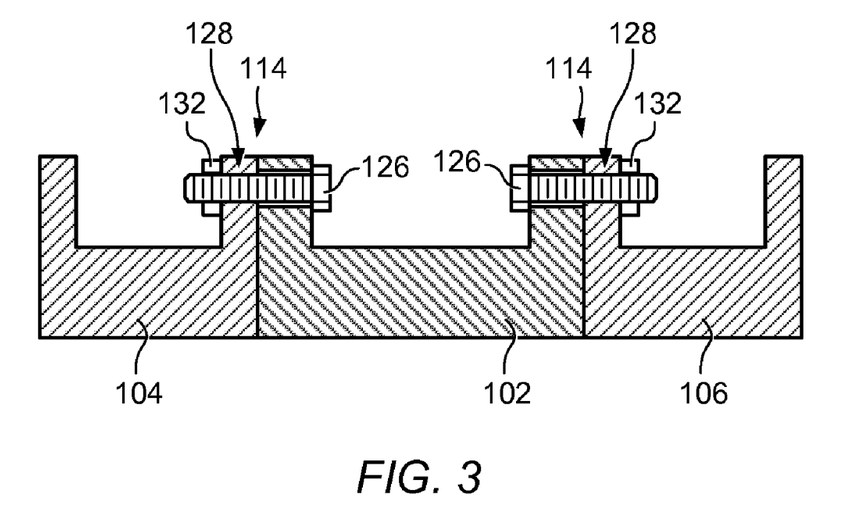
FIG. 3 is a cross sectional view illustrating one embodiment of a bus bar system including a bolt and nut fastening arrangement.

An embodiment of a bus bar system with an alternate fastening arrangement is illustrated in FIG. 3. In the embodiment shown in FIG. 3, internal bus bar 102 is coupled to external bus bars 104 and 106 with bolt and nut pairs. Bolts 126 each pass through clearance hole 128 in internal bus bar 102 and clearance hole 130 in external bus bars 104 and 106. The distal portions of bolts 126 extend into channel 108 of external bus bars 104 and 106. Nuts 132 may be threaded onto bolts 126. Torque may be applied to nuts 132 to achieve a desired amount of contact pressure at joint 114.

Figure 4:
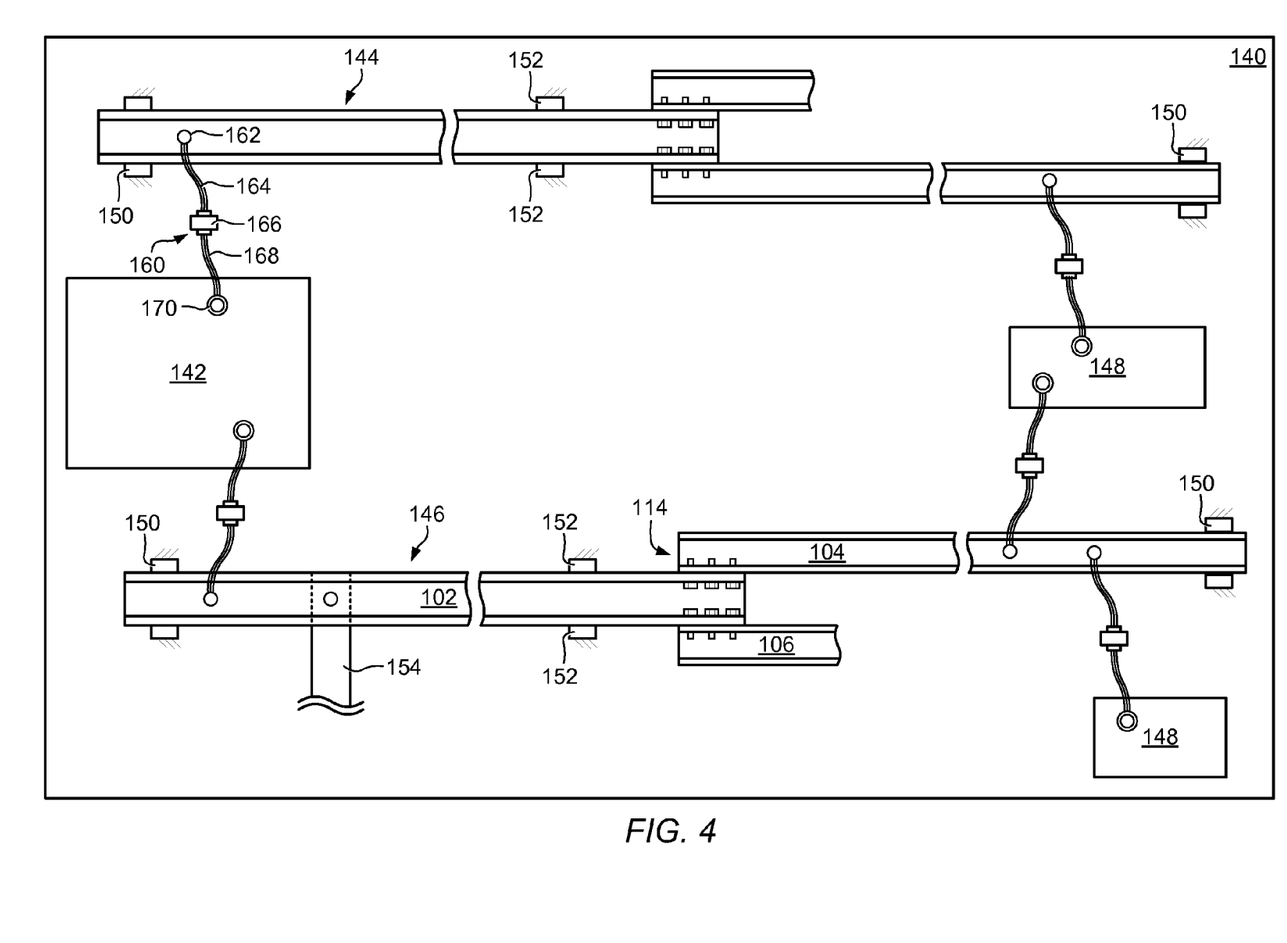
FIG. 4 is a top view illustrating one embodiment of a facility including a bus bar system with concentrators.

An embodiment of a facility including a bus bar system with concentrators is illustrated in FIG. 4. Facility 140 includes electrical power source 142, bus bar systems 144 and 146, and equipment 148. Equipment 148 may include various systems that require electrical power, signals, or data. In some embodiments, equipment 148 is mechanical equipment, such as pump motors and fan motors for cooling systems. Other examples of equipment include controllers, computer equipment, and lighting.

Bus bar systems 144 and 146 each include bus bars 102, 104, and 106. In some embodiments, joints 114 between bus bars may be as illustrated in FIG. 1. Bus bars for bus bar systems 144 and 146 may be installed on walls, floors, or ceiling of facility 140. In certain embodiments, bus bars may be carried in trays, conduits, or other suitable structures. Facility 140 includes brackets 150 and guides 152 for bus bars 102, 104, and 106. Although only two bus bar systems are shown in FIG. 4 for clarity, facility 140 may have more than two bus bar systems. For example, electrical power source 142 may be coupled to two hot bus bar systems and one neutral bus bar system. Equipment 148 may receive power by connections to at least one of the neutral bus bars and at least one of the hot bus bars. In some embodiments, bus bar systems may include various branches, such bus bar 154, to distribute power to convenient points throughout facility 140.

Bus bar systems 144 and 146 include connector assemblies 160. Each connector assembly 160 may provide a connection from a terminal on equipment 148 to one of bus bar systems 144 or 146. In some embodiments, some or all of the connector assemblies for a piece of equipment (e.g., hot and neutral power) may be bundled (e.g., into one cable assembly). In the embodiment shown in FIG. 4, each connector assembly 160 includes bus terminal 162, bus-side wire 164, concentrator 166, equipment-side wire 168, and equipment terminal 170. Bus terminal 162 and equipment terminal 170 may be, for example, ring terminals.

In some embodiments, concentrators may provide a transition from one conductive material (e.g., aluminum) to another conductive material (e.g., copper). Bus bars 102, 104, and 106 in bus bar systems 144 and 146 may be made of aluminum. Bus bars 102, 104, and 106 may accommodate connections of aluminum wire of a relatively large diameter. Equipment 148 may include standard lug terminals that are intended (e.g., sized) for use with copper wire of relatively small diameter. Concentrators 166 may provide a transition from aluminum wire on the bus-side to copper wire on the equipment side. Thus, in the example shown in FIG. 4, copper wire may be used for equipment-side wire 168 and aluminum wire may be used for bus-side wire 164, with concentrator 166 connecting aluminum bus-side 164 wire with copper equipment-side wire 168. In some embodiments, concentrators 166 may be positioned close to equipment 148 to minimize the amount of copper wire required for a system.

Figure 5:
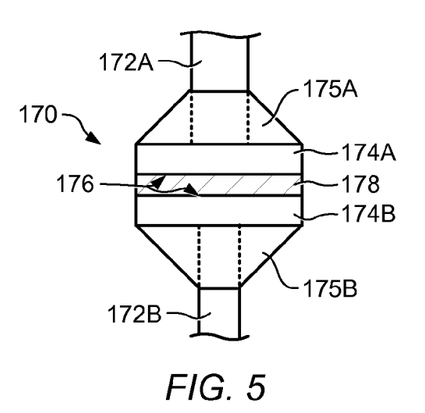
FIG. 5 is a side view illustrating one embodiment of a concentrator.

One embodiment of a concentrator is illustrated in FIG. 5. Concentrator 170 connects wire 172A to wire 172B. Wire 172A may be, for instance, an aluminum wire connected to a bus bar (e.g., bus bar 144 shown in FIG. 4), while wire 172B may be a copper wire connected to a terminal on equipment (e.g. equipment 148 shown in FIG. 4). Wire 172B may be of a smaller diameter than wire 172A.

Concentrator 170 includes conductive element 174A and conductive element 174B. In one embodiment, conductive elements 174A and 174B are cylindrical. Conductive elements 174A and 174B may have matching surfaces 176 at interface layer 178. Conductive element 174A may be made of the same material as wire 172A. Conductive element 174B may be made of the same material as wire 172B. In the embodiment shown in FIG. 5, wire 172A is welded to conductive element 174A by way of weld 175A. Wire 172B is welded to conductive element 174B by way of weld 175B. Weld 175A may be of the same the same material as wire 172A and conductive element 174A. For example, wire 172A, conductive element 174A, and weld 175A may all include aluminum. Weld 175B may be of the same the same material as wire 172B and conductive element 174B. For example, wire 172B, conductive element 174B, and weld 175B may all include copper.

Conductive element 174A is electrically connected to conductive element 174B at interface layer 178. In some embodiments, interface layer 178 is produced using powder metallurgy (e.g., by welding a sheet of alloy powder between conductive elements 174A and 174B. Powder weld at interface layer 178 may maintain an electrical connection between wire 175A and 175B even though elements on either side of the interface may have different coefficients of thermal expansion (such as aluminum versus copper).

In some embodiments, provides the ability to land aluminum cabling onto copper terminated equipment. The landing between the aluminum and copper may expand and contract such that electrical connection is maintained under changes in temperature.

In some embodiments, the lengths of bus bars are selected so that expansion joints are provided at desired minimum intervals on a linear run of bus bar. The expansion joints may provide stress relief to the bus bar system when the bus bar system is under electrodynamic loads and/or environmental loads. In certain embodiments, a minimum number of joints is established for a particular linear run of bus bars. For example, at least one joint may be provided for every 100 feet of a run of a bus bar system.

As discussed above relative to FIG. 1, torque on the fasteners connecting bus bars may be set to be within a predetermined range. Over time, fasteners at the joints of a bus bar system may fall below the desired torque levels. In such circumstances, the joints may have insufficient contact pressure to ensure adequate flow of current through the joints. In some embodiments, torque levels are periodically checked, and torque levels reset as appropriate. In one embodiment, torque levels are checked about twice a year.

Figure 6:
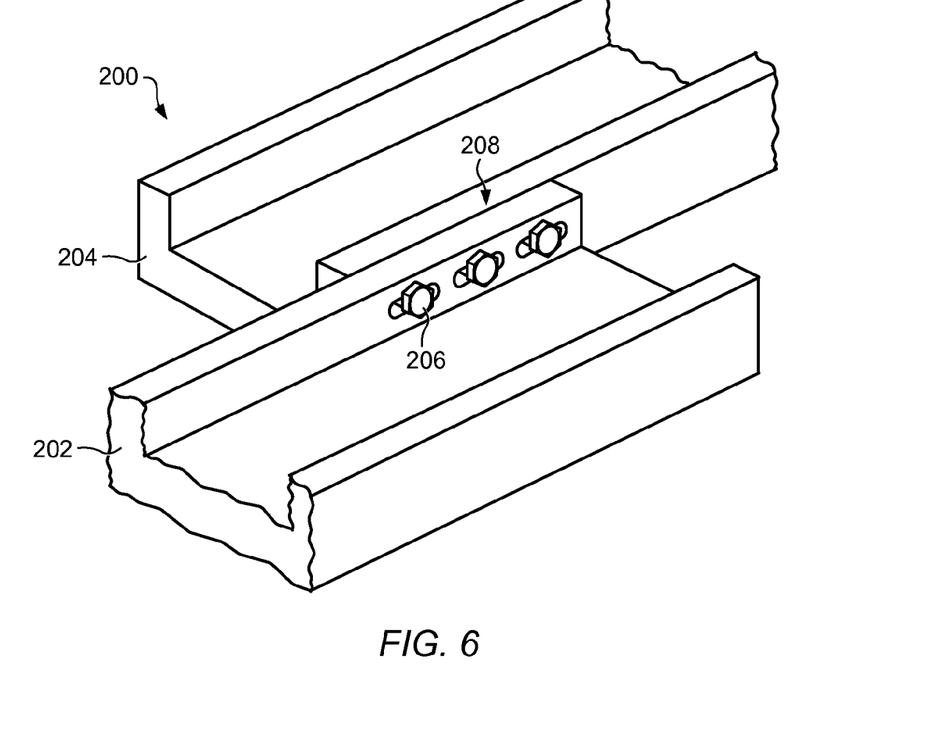
FIG. 6 illustrates one embodiment of a bus bar system having a joint between two-bus bars.

An embodiment of a bus bar system including a two-bus bar joint is illustrated in FIG. 6. Bus bar system 200 includes bus bar 202, bus bar 204, and fasteners 206. In the embodiment shown in FIG. 6, bus bar system 200 may include guides (e.g., guides 152 shown in FIG. 4) to inhibit lateral displacement of the bus bars at joint 208 (e.g., when bus bar 202 and bus bar 204 are thermally expanding or contracting).

Figure 7:
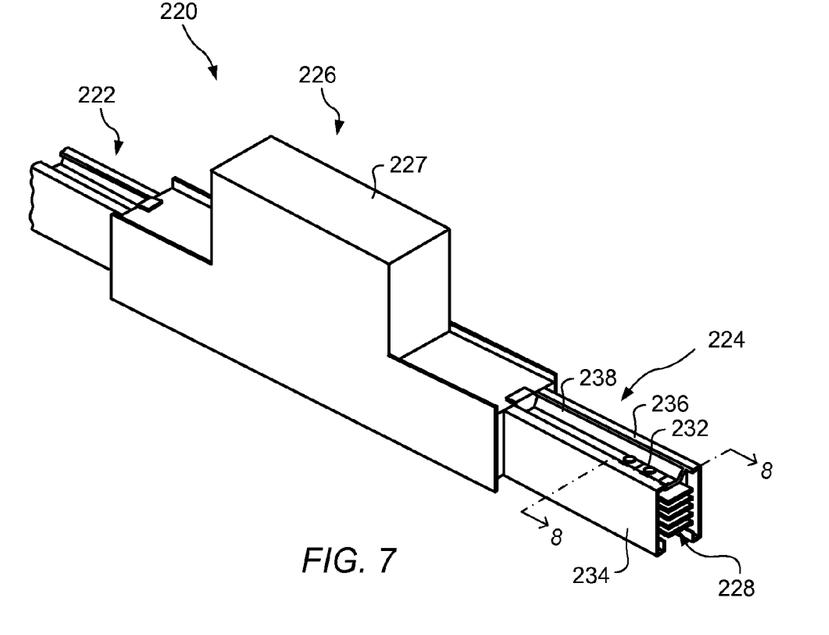
FIG. 7 illustrates one embodiment of an expansion fitting connecting two bus bar assemblies.

An embodiment of an expansion fitting for connecting bus bar assemblies is shown in FIG. 7. Bus bar system 220 includes bus bar assembly 222, bus bar assembly 224, and expansion fitting 226. Expansion fitting 226 mechanically couples bus bar assembly 222 with bus bar assembly 224. (For purposes of illustration, only the ends of bus bar assembly 222 and bus bar assembly 224 near expansion fitting 226 are shown in FIG. 7). Expansion fitting 226 includes housing 227. Bus bar assemblies 222 and 224 each include bus bars 228, bus bar casing 230, and fasteners 232. Bus bar casing 230 includes left rail 234, right rail 236, upper plate 238, and lower plate 240 (shown in FIG. 8). Bus bars 228 are held in a spaced relation to one another between left rail 234 and right rail 236. In various embodiments, bus bars of a bus bar assembly may be electrically coupled to another, electrically isolated from another, or a combination thereof.

Figure 8:
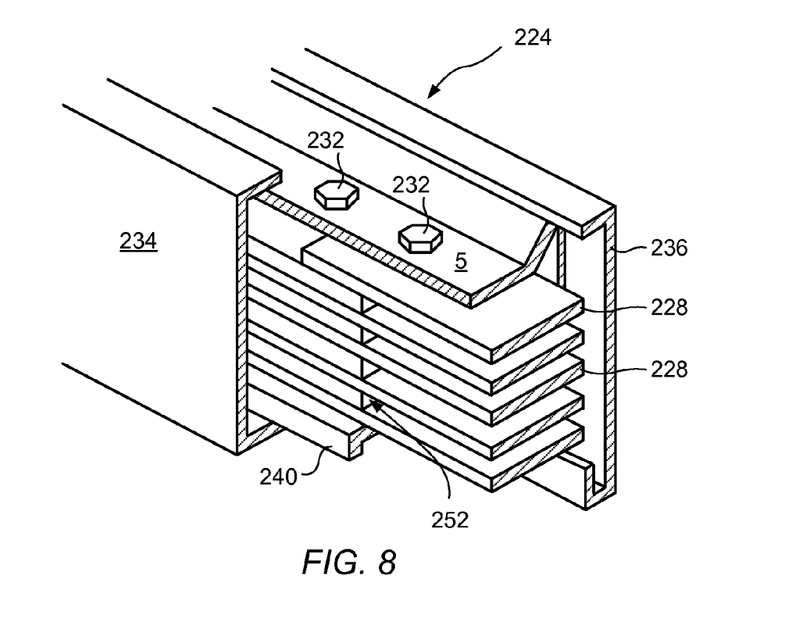
FIG. 8 is a cross sectional view illustrating a connection between an expansion fitting and bus bar assembly according to one embodiment.

FIG. 8 is a cross sectional view showing details of a connection between expansion fitting 226 and bus bar assembly 224 according to one embodiment. Interconnect bus bars 252 may extend through housing 227 of expansion fitting 226

(shown in FIG. 7). Opposing ends of interconnect bus bars 252 may protrude from either end of housing 227. Interconnect bus bars 252 may be held in parallel spaced relationship with one another. As shown in FIG. 8, interconnect bus bars 252 of expansion fitting 226 and bus bars 228 of bus bar assembly 224 are arranged so that interconnect bus bars 252 can intermesh with bus bars 228 in an alternating arrangement from top to bottom.

Figure 9:
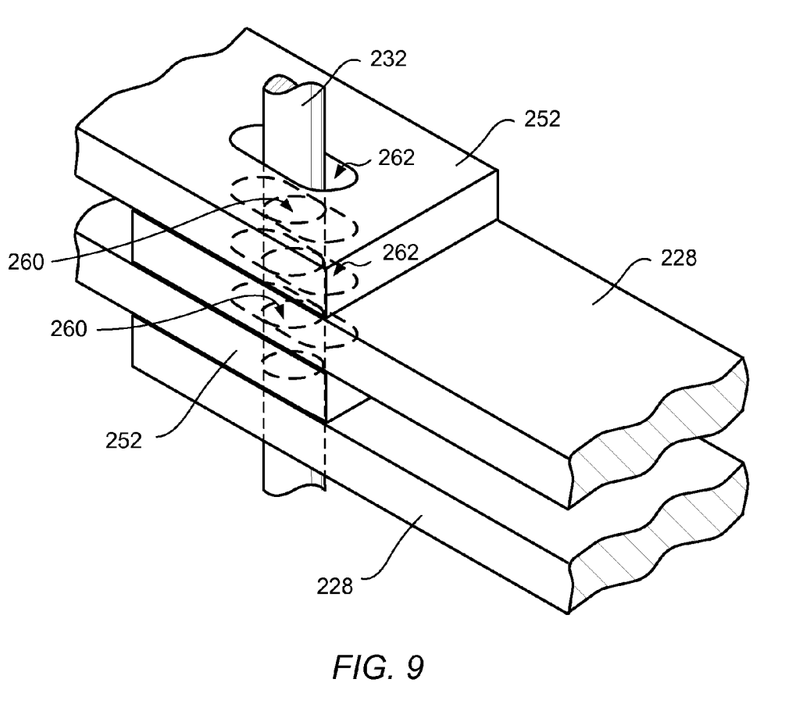
FIG. 9 illustrates a portion of a joint between an expansion fitting and a bus bar assembly according to one embodiment.

FIG. 9 illustrates a portion of a joint between expansion fitting 226 and bus bar assembly 224 according to one embodiment. For purposes of illustration, only two bus bars 228, two interconnect bus bars 252, and shank 258 of fastener 232 are shown in FIG. 9, with the remainder of the elements of the joint being removed for clarity. Bus bars include holes 260. Interconnect bus bars 252 include slots 262.

To couple expansion fitting 226 with bus bar assembly 224, the user may slide the end of bus bar assembly 224 against the end of expansion fitting 226 with fasteners 232 removed from bus bar assembly 224 (see FIG. 7). Bus bars 228 may slide into intermeshing contact with interconnect bus bars 252 to a position where holes 260 in bus bars 228 are aligned with slots 262 in interconnect bus bars 252 (see FIG. 9). Fastener 232 may be installed through holes 260 and slots 262. Fastener 232 may be threaded into a receptacle (e.g., a tapped hole in lower plate 240 and tightened to a desired torque level to create slotted joint 264. Electric contact may be established at mating surfaces of bus bars 228 and interconnect bus bars 252. Bus bar assembly 222 may be coupled to expansion fitting 226 in a similar manner. Relative movement at slotted joints between bus bar assembly 224 and expansion fitting 226 and/or between bus bar assembly 222 and expansion fitting 226 may allow for relief of electrodynamic stresses in the bus bar system.

Figure 10:
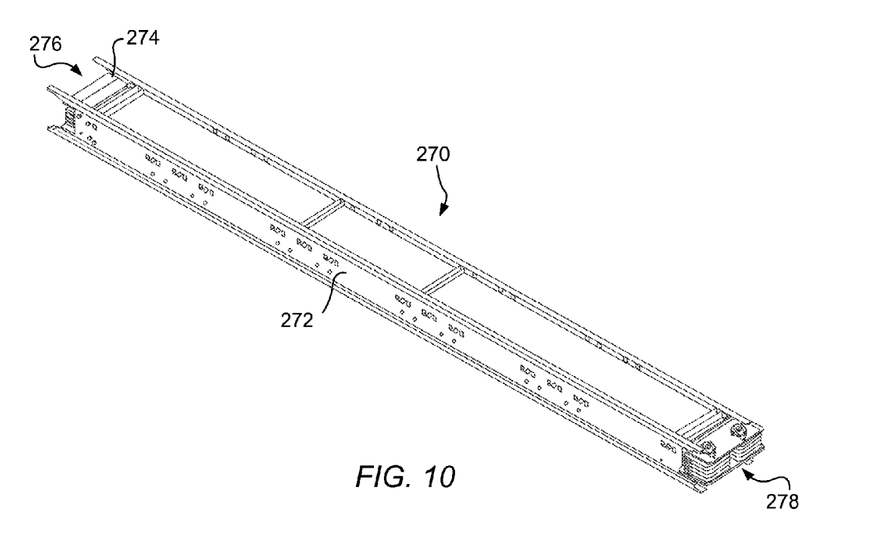
FIG. 10 illustrates another embodiment of a bus bar assembly including stacked bus bars.
Figure 11:
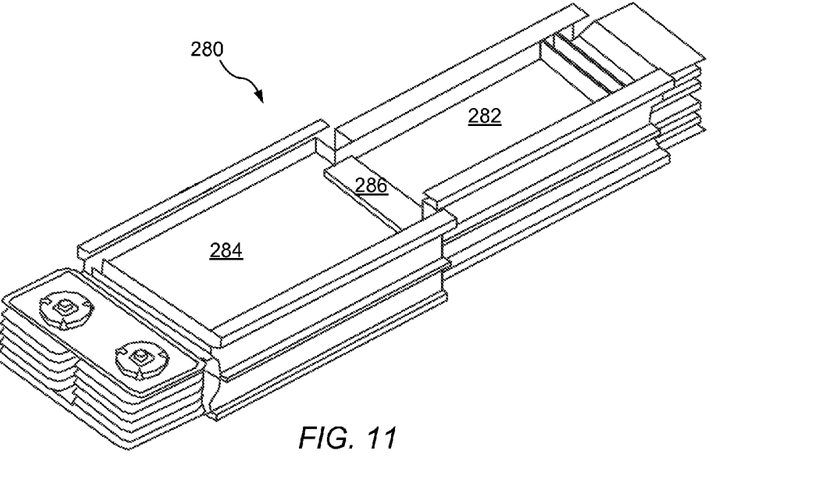
FIG. 11 illustrates one embodiment of a concentrator including stacked bus bars.

An alternate embodiment of a bus bar assembly including multiple bus bars is illustrated in FIG. 10. Bus bar assembly 270 includes casing 272 and bus bars 274. Bus bar assembly further includes end 276 and end 278. Two or more of bus bar assemblies 270 may be connected in series (e.g., with end 276 of one bus bar assembly connecting with end 278 of another bus bar 270) to form a desired length for a run An embodiment of a concentrator for a bus bar system is illustrated in FIG. 11. Concentrator 280 may be incorporated into a system as a tap off or spur from elongated bus bar assemblies (such as bus bar assemblies 270 shown in FIG. 10). Concentrator 280 may be used to electrically connect to various load devices or power sources to the system. Concentrator 280 includes device side portion 282 and bus side portion 284, and junction 286. In some embodiments, conductors on device side portion 282 are made of one material and conductors on bus side portion 284 are made of another material. For example, conductors on device side portion 282 may be made of copper while conductors on bus side portion 284 are made of aluminum. Junction 286 may provide an electrical transition between conductors of different materials. In certain embodiments, junction 286 may include an interface layer between one or more bus bar elements, such as described above with respect to FIG. 6.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a first bus bar comprising one or more slots; a second bus bar; and
one or more fasteners, at least one of the fasteners being coupled with the second bus bar to couple the first bus bar to the second bus bar, a portion each of the one or more fasteners extending through one of the slots in the first bus bar, each of the one or more fasteners configured to move along at least a portion of a respective slot of the one or more slots to allow relative movement between the first bus bar and the second bus bar along the respective slot under at least one electrical load condition, wherein at least one of the one or more fasteners is preloaded to a predetermined range to maintain electrical connectivity between the first bus bar and the second bus bar while still allowing said relative movement to provide mechanical stress relief under the at least one electrical load condition.

2. The system of claim 1, wherein at least one of the fasteners is a threaded fastener, wherein the second bus bar comprises a threaded hole configured to receive the threaded fastener.

3. The system of claim 1, wherein at least one of the fasteners is a threaded fastener, wherein at least one of the threaded fasteners is preloaded to the predetermined range.

4. The system of claim 1, wherein at least one of the fasteners is a threaded fastener, wherein, under the at least one electrical load condition of the system, at least one of the fasteners is configured to slide along one of the slots and the second bus bar is configured to move relative to the first bus bar.

5. The system of claim 1, wherein the at least one fastener comprises two or more fasteners, wherein the first bus bar comprises one of the slots for each of the fasteners, wherein each of the fasteners couples to the second bus bar through one of the slots in the first bus bar.

6. The system of claim 1, wherein the first bus bar further comprises a longitudinal axis, wherein the one or more slots comprise a longitudinal axis, wherein the longitudinal axes of the one or more slots are substantially parallel to the longitudinal axis of the first bus bar.

7. The system of claim 1, further comprising a third bus bar, wherein the second bus bar is coupled on one side of the first bus bar and the third bus bar is coupled on the other side of the first bus bar.

8. The system of claim 7, wherein the third bus bar is configured to receive one or more additional fasteners, wherein at least one of the additional fasteners couples to the third bus bar to couple the first bus bar to the third bus bar, a portion of each additional fastener extending through one of the slots in the first bus bar, the at least one additional fastener configured to move along at least a portion of the one of the slots to allow said relative movement between the first bus bar and the third bus bar along the length of the one of the slots.

9. The system of claim 1, wherein at least one of the bus bars is made of aluminum or an aluminum alloy.

10. The system of claim 1, further comprising one or more concentrators electrically coupled to at least one of the bus bars.

11. The system of claim 1, wherein system comprises an expansion fitting, wherein one of the first or second bus bars is part of the expansion fitting, wherein the other of the first or second bus bars is part of an elongated bus bar assembly.

12. A system, comprising:
two or more bus bars; and one or more fasteners configured to couple at least two adjoining bus bars of the two or more bus bars at a slotted joint; the one or more fasteners being configured to hold the adjoining bus bars in contact with one another to enable current to pass from one of the adjoining bus bars to another of the adjoining bus bars through the contacting surfaces of the adjoining bus bars, the slotted joint being configured to reduce mechanical stress on at least one of the bus bars when the system is under at least one electrical load condition, wherein at least one of the one or more fasteners is preloaded to a predetermined range to maintain electrical connectivity between the adjoining bus bars while still providing for mechanical stress relief under the at least one electrical load condition.

13. The system of claim 12, wherein at least one of the bus bars comprising a slot, wherein one or more of the fasteners passes through the slot, wherein the slotted joint is configured to allow the fastener to move within the slot when the system is under the at least one electrical load condition.

14. The system of claim 12, wherein the slotted joint is configured to allow relative movement between the coupled bus bars in the longitudinal direction of the bus bars under the at least one electrical load condition.

15. The system of claim 12, wherein at least one of the fasteners is a threaded fastener, wherein at least one of the threaded fasteners is preloaded to a predetermined range.

16. The system of claim 12, wherein the two or more bus bars form a first segment and a second segment, wherein a total cross sectional area of the first segment is substantially equal to a total cross sectional area of the second segment.

17. The system of claim 12, wherein the two or more bus bars comprise an internal bus bar and two external bus bars, wherein the two external bus bars are coupled to opposing sides of the internal bus bar.

18. The system of claim 12, wherein the cross sectional area of the internal bus bar form is substantially equal to the total cross sectional area of the two external bus bars.

19. The system of claim 12, further comprising a power source coupled to at least one of the bus bars.

20. The system of claim 12, wherein the system comprises an additional slotted joint for at least about every 100 feet of linear run of the one or more bus bars.

21. The system of claim 12, further comprising:
one or more load devices;
at least one bus-side conductor coupled to at least one of the bus bars, the at least one bus-side conductor being made of a first material;
at least one load-side conductor coupled to at least one of the load devices, the at least one load-side conductor being made of a second material; and
at least one concentrator configured to electrically couple to at least one of the bus-side conductors to at least one of the load-side conductors.

22. The system of claim 21, wherein the concentrator comprises an interface layer, wherein the interface layer comprises a metal alloy powder weld.

23. The system of claim 12, wherein at least one of the bus bars is made of aluminum or an aluminum alloy.

24. A method, comprising:
connecting a bus bar to at least one other bus bar with one or more fasteners, at least one of the fasteners passing through a slot in one of the bus bars to form a slotted joint connecting the bus bar and the at least one other bus bar as adjoining bus bars; and applying a torque to within a predetermined range to the one or more fasteners such that the one or more fasteners hold the adjoining bus bars in contact with one another to enable current to pass from one of the adjoining bus bars to another of the adjoining bus bars, the slotted joint being configured to reduce mechanical stress on at least one of the adjoining bus bars under at least one electrical load condition while still maintaining electrical connectivity between the adjoining bus bars.

25. The method of claim 24, further comprising:
checking the torque on the one or more fasteners at a specified interval after applying the torque to the one or more fasteners; and
if the torque level of at least one of the fasteners is no longer in the predetermined range, re-applying torque to the fasteners to bring the torque level into the predetermined range.

26. A bus system, comprising:
two or more bus bar assemblies, each of the bus bar assemblies comprising at least one bus bar; a fitting configured to electrically couple a first one of the bus bar assemblies with at least one other of the bus bar assemblies, the fitting comprising one or more interconnect bus bars, wherein at least one of the interconnect bus bars comprise one or more slots; and one or more fasteners configured to secure at least one of the bus bar assemblies to the fitting, wherein at least one of the fasteners is preloaded to a predetermined range to couple in at least one of the slots of the one or more interconnect bus bars to allow relative movement between the fitting and at least one of the bus bar assemblies under at least one electrical load condition to provide mechanical stress relief while still maintaining electrical connectivity between the first one of the bus bar assemblies and at least one other of the bus bar assemblies.

27. The system of claim 26, wherein at least one of the one or more fasteners is configured to move along at least a portion of one of the slots to allow relative movement between the fitting and one of the bus bar assemblies under the at least one electrical load condition.

28. The system of claim 26, wherein at least one of the bus bar assemblies comprises a stack of two or more bus bars, wherein the fitting comprises one or more interconnect bus bar assemblies, wherein the one or more interconnect bus bars of the fitting are configured to intermesh with the two or more bus bars of the two or more bus bar assemblies.

29. The system of claim 26, wherein at least one of the two or more bus bar assemblies comprises an upwardly facing channel, wherein a head of at least one of the one or more fasteners is at least partially within the channel.

\* \* \* \* \*